United States Patent
Sherman et al.

(10) Patent No.: US 6,966,520 B2
(45) Date of Patent: Nov. 22, 2005

(54) LINE TENSIONING AND COUPLING APPARATUS

(76) Inventors: Keith E. Sherman, 1111 SW. Blue Water Way, Stuart, FL (US) 34997; Norman H. Schmotzer, 637 Shore Rd., North Palm Beach, FL (US) 33408-3728

( * ) Notice: Subject to any disclaimer, the term of this patent is extended or adjusted under 35 U.S.C. 154(b) by 0 days.

(21) Appl. No.: 10/666,613

(22) Filed: Sep. 18, 2003

(65) Prior Publication Data
US 2005/0061905 A1    Mar. 24, 2005

(51) Int. Cl.[7] ............................................. B65H 75/38
(52) U.S. Cl. .................................................. 242/388.4
(58) Field of Search .......................... 242/388, 388.2, 242/388.3, 388.4, 388.5, 405.1; 254/217, 254/213, 214, 223, 369; 24/68 R, 69 R, 70 R, 24/70 CT, 70 ST, 69 ST, 71.2, 68 CD, 19

(56) References Cited
U.S. PATENT DOCUMENTS

| | | | |
|---|---|---|---|
| 515,340 A * | 2/1894 | Judd | |
| 1,383,665 A * | 7/1921 | Rohan | |
| 1,472,167 A * | 10/1923 | Grimme | 242/388.4 |
| 1,570,291 A * | 1/1926 | Van Alstine | 242/388.4 |
| 2,048,300 A * | 7/1936 | Showers | 242/388 |
| 2,204,939 A * | 6/1940 | Lyons | 242/388.2 |
| 2,229,003 A * | 1/1941 | Fly | 242/388.2 |
| 2,451,933 A * | 10/1948 | England | 242/388.4 |
| 3,128,106 A * | 4/1964 | Zinkel, Jr. | |
| 3,711,901 A * | 1/1973 | Close | 242/388.4 |
| 3,858,279 A * | 1/1975 | Brattstrom | |
| 4,144,620 A * | 3/1979 | Schaeffer | |
| 5,803,390 A * | 9/1998 | Clary | 242/388.2 |
| 5,809,618 A * | 9/1998 | Perhacs | 242/338.4 |
| 6,341,742 B1 * | 1/2002 | Rosenthal | 242/388.2 |

* cited by examiner

Primary Examiner—William A. Rivera
(74) Attorney, Agent, or Firm—Norman Friedland

(57) ABSTRACT

A rope or line tensioning and/or coupling apparatus for tensioning a rope or coupling two ropes that is formed from a planar member having judiciously located slots and a drilled hole that allows the rope to be inserted into the drilled hole, looped with a knot for passing the loop through a slot formed intermediate the side edges of the apparatus and opposing slots at the top for securing the loop portions and a series of slots at the bottom for helically winding the rope or line by inserting opposite disposed slots.

17 Claims, 7 Drawing Sheets

LINE TENSIONING AND COUPLING APPARATUS

TECHNICAL FIELD

This invention relates to apparatus for tying an object with a line, rope and the like and applying tension thereto and/or coupling two lines, ropes or the like together.

BACKGROUND OF THE INVENTION

As one skilled in this technology readily realizes, it is often difficult to tie an object like a boat to the dock, or a bumper to a boat or tie down a load on a cargo bed and be able to apply tension when attempting to knot the rope or line together. For example, loads on the bed of a truck are tied down by placing a link chain over the load and anchoring it to the structure of the truck. A ratchet type of mechanism carries a hook that attaches to one of the links of the chain that takes up the slack of the chain by a ratcheting mechanism that is operatively connected to the hook. The operator merely pumps the handle of the ratchet so as to translate the hook until the chain is pulled taut. In the case of bumpers used to protect the hull of a boat, as another example, the bumper is located on the side of a water craft and needs to be raised or lowered to a point of the side of the water craft where the bumper prevents the water craft from bumping against a surface that would cause injury thereto. Another example is where a boat is tied to the dock and the tie line needs to be tensioned so as to place the boat in the proper docked position. Other tensioning devices include a pair of rotatable jaws that accept the rope and by pulling in one direction the rope slides between the jaws and by pulling the rope in the opposite direction the jaws squeeze together and prevent the rope from moving in that direction. Another example of where this invention has utility is where two ropes are needed to be tied together and it is difficult or impossible to knot the two ropes together.

We have found that we can solve these tying problems by providing an apparatus with judiciously located slots and apertures and with discrete radii at certain locations making it possible to tension the line with little difficulty and likewise, the same degree of ease is afforded by this invention for coupling two lines together. The invention is characterized as being relatively easy to use, is reliable in that it maintains the tension regardless of the load, within reason, and that it is relatively inexpensive to make. The apparatus of this invention can be made from a plastic material or any other material that is light in weight, relatively small so as to be easy to carry and handle and will float in water, so as not to sink and it is corrosive resistant.

SUMMARY OF THE INVENTION

An object of this invention is to provide an improved tensioning device for tying with lines or rope.

Another object of this invention is to provide an improved coupling device for coupling two separate ropes together.

A feature of this invention is a light weight, relatively small planar member that has opposing top slots, a first aperture and a second aperture and a plurality of oriented slots on opposite sides for wrapping the line around the apparatus and through the slots. These plurality of slots have right angled faces that are formed on opposite surfaces of each of the slots while the remaining portion of where the line or rope is wrapped or inserted is formed with radius or may otherwise be beveled.

A feature of this invention is that the planar tensioning/coupling body is made from a non-corrosive material that floats and is characterized as being simple to use, inexpensive to manufacture and reliable to hold the load without slippage.

The foregoing and other features of the present invention will become more apparent from the following description and accompanying drawings.

Figure 1:
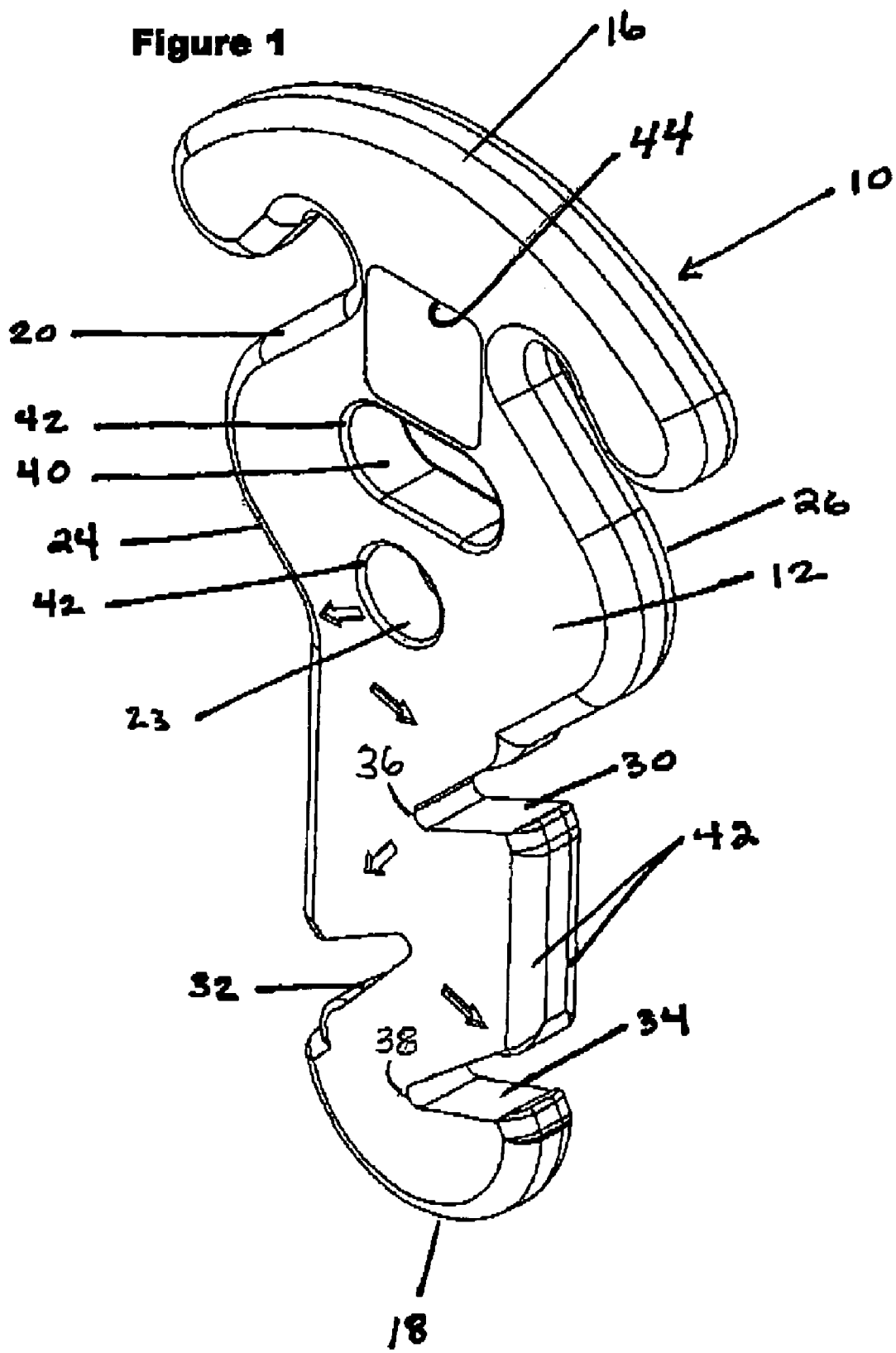
FIG. 1 is a perspective view illustrating the details of this invention.
Figure 2:
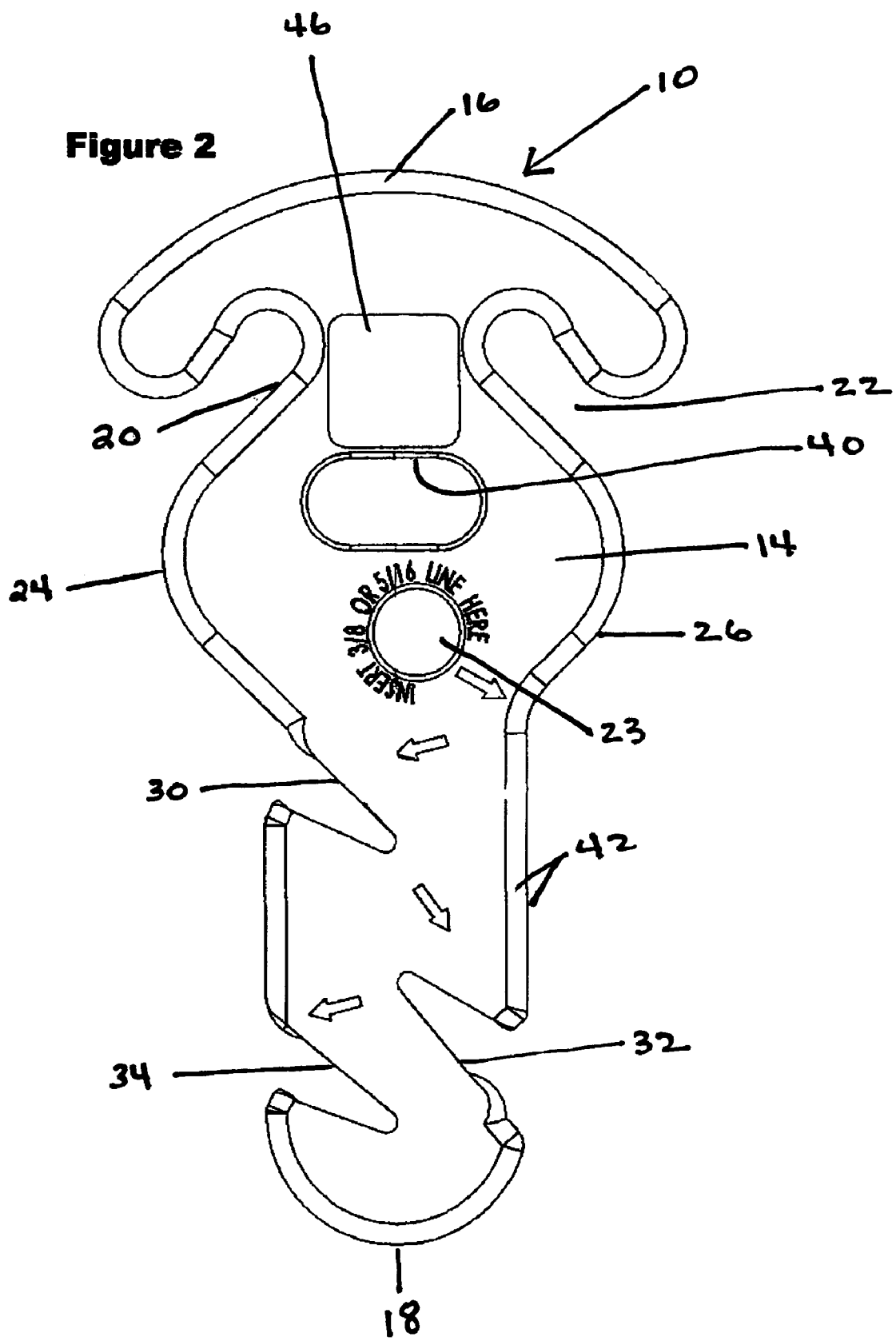
FIG. 2 is a view in elevation of the front face of this invention.

These figures merely serve to further clarify and illustrate the present invention and are not intended to limit the scope thereof.

DETAILED DESCRIPTION OF THE INVENTION

While the preferred embodiment described a particular configuration, dimensions and material, as one skilled in the art these parameters can be changed without changing the scope of this invention, unless a particular configuration or dimension is specified as not capable of being modified. For example, the unit is made in the preferred embodiment as being sufficiently small to be hand-held. Obviously, it can take any size which would be predicated by the particular application to which it is being utilized. As used herein the terms line, rope, braid, cable and the like are synonymous and connote the same meaning and function.

The invention can best be understood by referring to all of the Figs. where the tensioning/coupling apparatus is generally illustrated by reference numeral 10 as having a planar face portion 12 and a planar back portion 14, a curved top portion 16 and a curved bottom portion 18. The unit can be made from any material and preferably from a polypropylene synthetic or any other synthetic or non-synthetic material. However in the preferred embodiment the material selected would be plastic material that floats in water and resists corrosion. The overall dimension is where the longest vertical dimension is 5.75 inches (") and the widest horizontal portion is 3.0" and the thickness is 0.38". Obviously, these dimensions can vary depending on the application to which this invention is utilized.

A drilled hole 23 intermediate the edges 24 and 26 is disposed not quite half way between the top portion 16 and the bottom portion 18. For the sake of the description of this invention, all contours and dimensions discussed in the specification that are above the drilled hole 23 will be referenced to the top end and all contours and dimensions below the drilled hole 23 will be referenced toward the bottom end.

Adjacent to the top portion 16 are a pair of diametrically opposed slots 20 and 22 that are angularly disposed so that the angle is from the side edges 24 and 26 respectively and extend toward the top portion 16 and terminating at the apex 28 and 30, respectively, noting that the slots 20 and 22 do not extend as far as the center line A.

Three angular disposed slots 32, 34 and 36 are disposed at the bottom end of the apparatus 10 at the narrow portion of the apparatus 10. Slots 30 and 34 have are similarly angled and extend from the side edge 26 and extending toward the bottom end. These slots 30 and 34 extend so that the apex 36 and 38, respectively, extend to the center line A, but not beyond. The angle of slot 32 is in the opposite direction, i.e. It extends toward the top end and likewise extends to center line A, but not beyond. The slots 32, 34 and 36 may be angled so that the widest portion is sufficiently wide to receive the rope and as the rope progresses inwardly in the slot toward the center line A it will bind in the slots. The slots 20 and 22, of course, are sufficiently wide to receive the rope.

Just above the drilled hole is a through slot 40 that is located intermediate the side edges 24 and 26 and passes through the center line A. The height of the slot 40 is dimensioned to receive the rope and the length of slot 40 is sufficient to pass 2 portions of the rope, i.e. 2 times the rope's diameter. All the edges of the apparatus 10 that have the double lines 42 are rounded, otherwise known as radii or may be beveled. However, the surfaces that are formed on the inside of slots 30, 32 and 34 are flat and not beveled. It has been found that the rope will not slip when the apparatus 10 is fully wound when the inside surfaces of slots 30, 32 and 34 are flat.

A recess 44 and 46 may be included on the front face 12 and back face 14, respectively for placing an insert with a logo indicia thereon in the recess so as to be seen from either face of the apparatus. The indicia of arrows as shown in the Figs. may be utilized to indicate the direction of the rope when wound onto apparatus 10.

Figure 4:
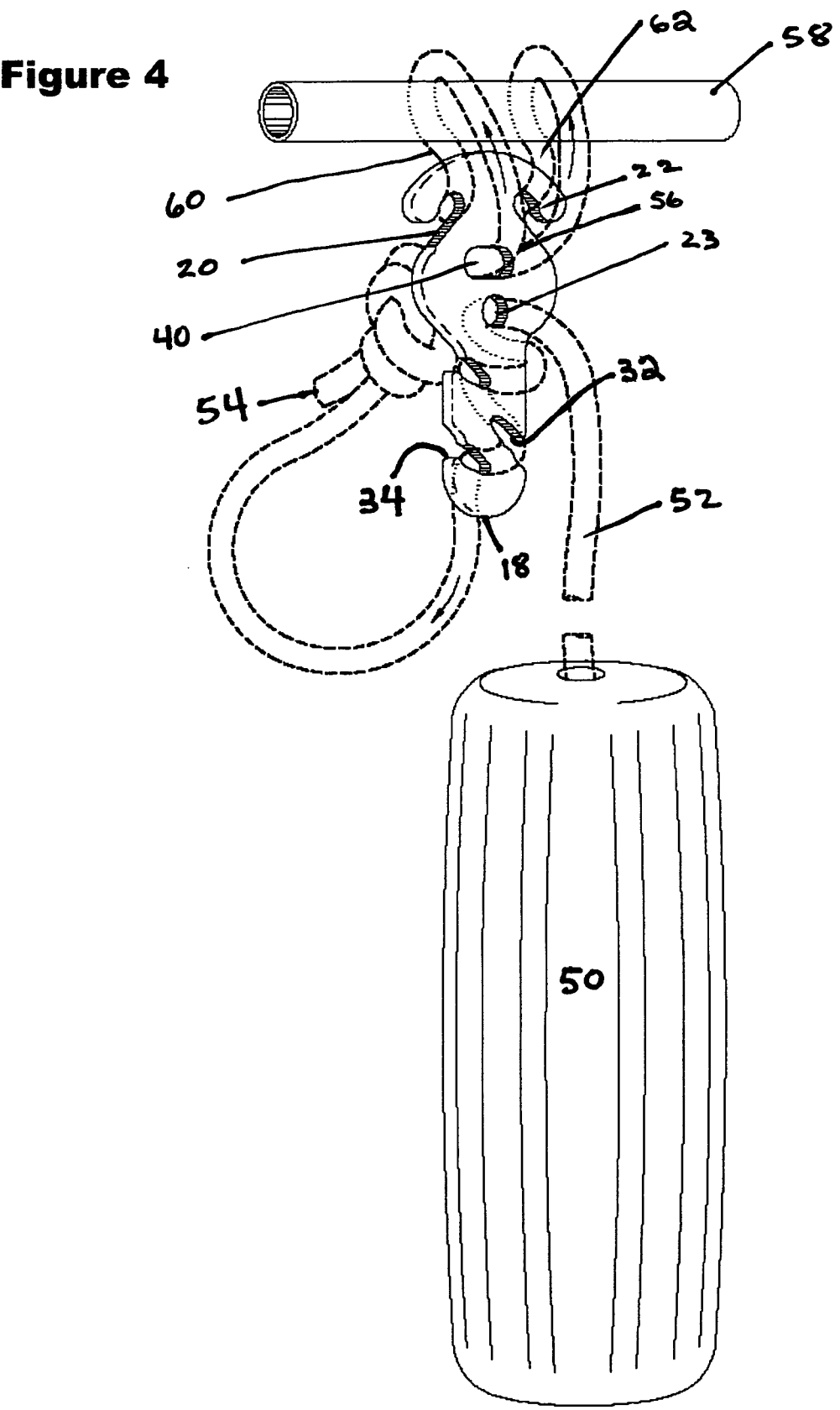
FIG. 4 is a perspective view illustrating this invention as being utilized to support a fender for a water vehicle.

FIG. 4 exemplifies this invention when the apparatus 10 is used to secure fender/bumper 50. The rope 54 normally attached to the bumper 50 is adjusted to the right length by use of the inventive apparatus 10. The end of rope 54 is passed through drilled hole 23 and is looped and tied by a conventional knot, noticing that the knot is sufficiently wide that it cannot pass through drilled hole 23. The loop 56 is then passed through the slot 42 and looped around the support 58. Each portion of loop 56, namely portions 60 and 62, are then inserted into the slots 20 and 22 and the rope is tightened against the support 58. The rope 52 is pulled through the drilled hole 23 until the bumper 50 is at the desired height. The rope is then wound in a helical fashion from the side where the knot is located into slots 30, 32 and 34.

It is apparent from the foregoing that when used on a boat, one would leave the unit tied as shown in FIG. 4 and the fender or other protectio device as a bumper, cushion or the like can be raised or lowered by undoing the rope from slots 30, 32 and 34 and pulling on the rope 52 to the desired length and then re-secure the rope into these slots.

Figure 5:
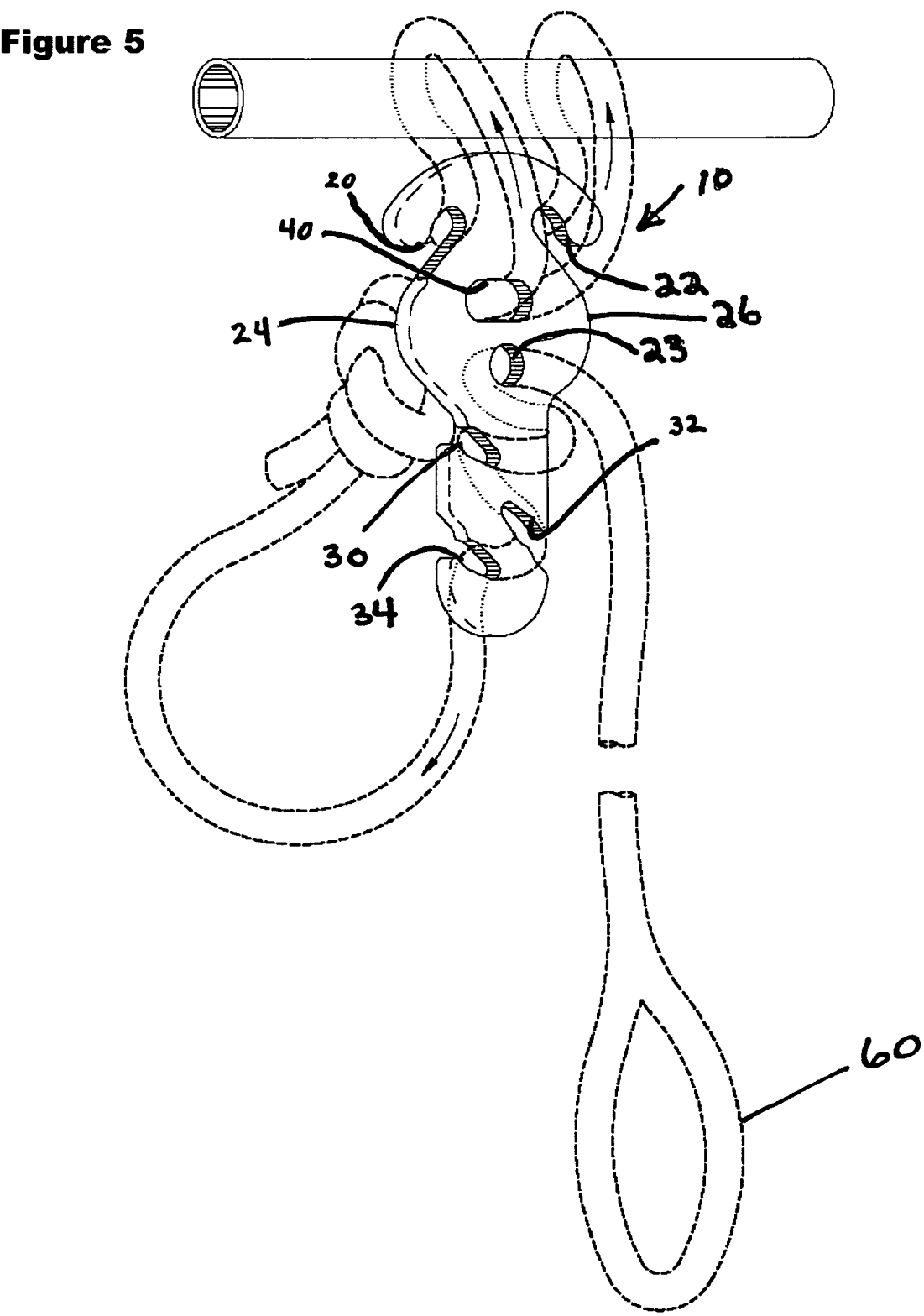
FIG. 5 is a perspective view illustrating this invention where one portion of the rope is tied to a support member and the end of the rope can include a loop where it can be looped over a post as, for example, to tie a boat to a post.

FIG. 5 exemplifies the apparatus 10 being used for rope that carries a loop that can be used to secure the water vehicle to a dock or the like, where the loop 60 is looped over a post attached to the dock.

Figure 6:
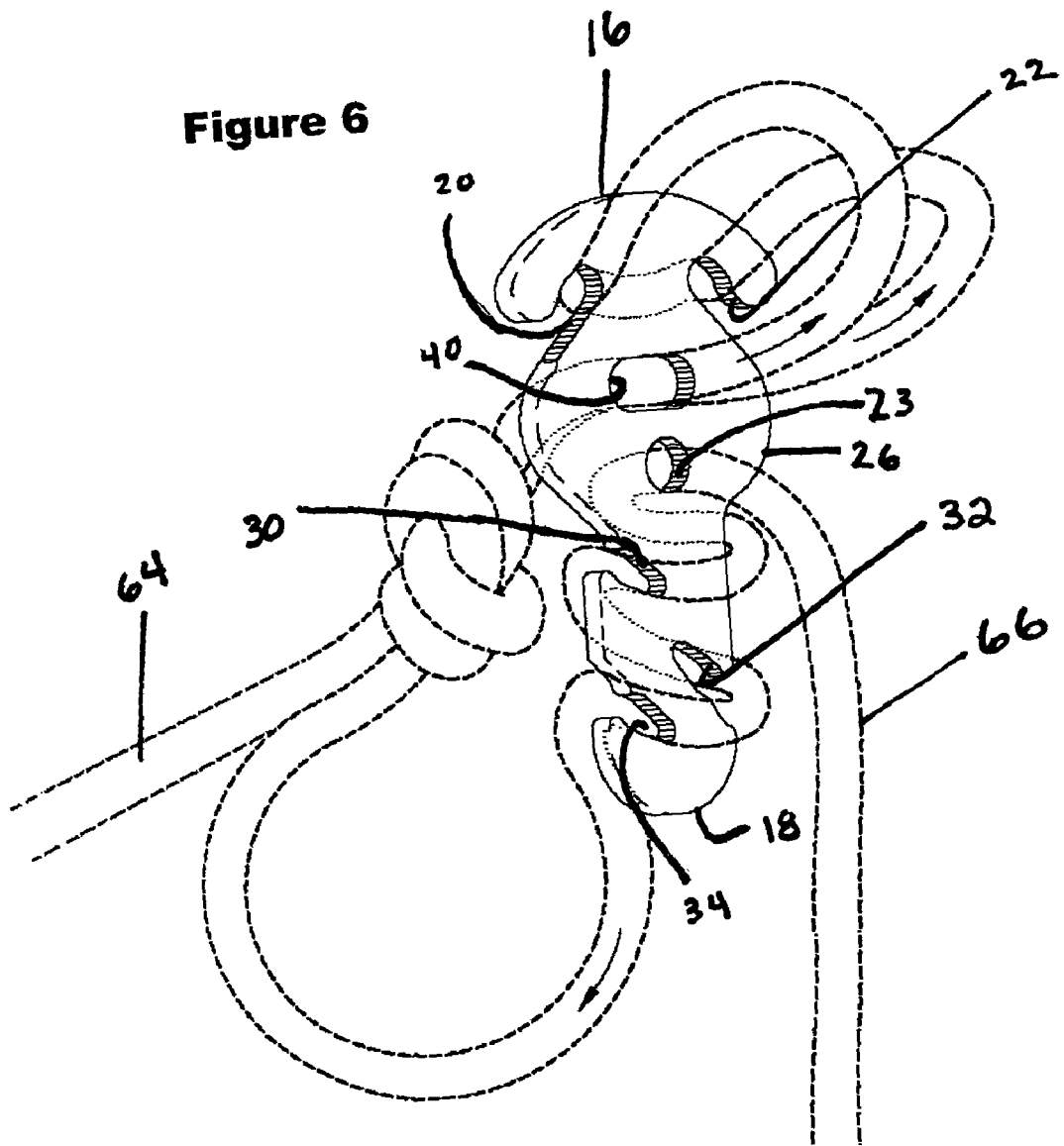
FIG. 6 is a perspective view illustrating where this invention is utilized where both ends of the rope can be tied to structures.

FIG. 6 exemplifies the apparatus 10 being used to tie either end of the rope to two different support structures. In this instance the looped rope portions 60 and 62 do not fit around a support structure but merely fit into the slots 20 and 22. The end portions 64 and 66 are used to tie to the two different support structures or objects (not shown).

Figure 3:
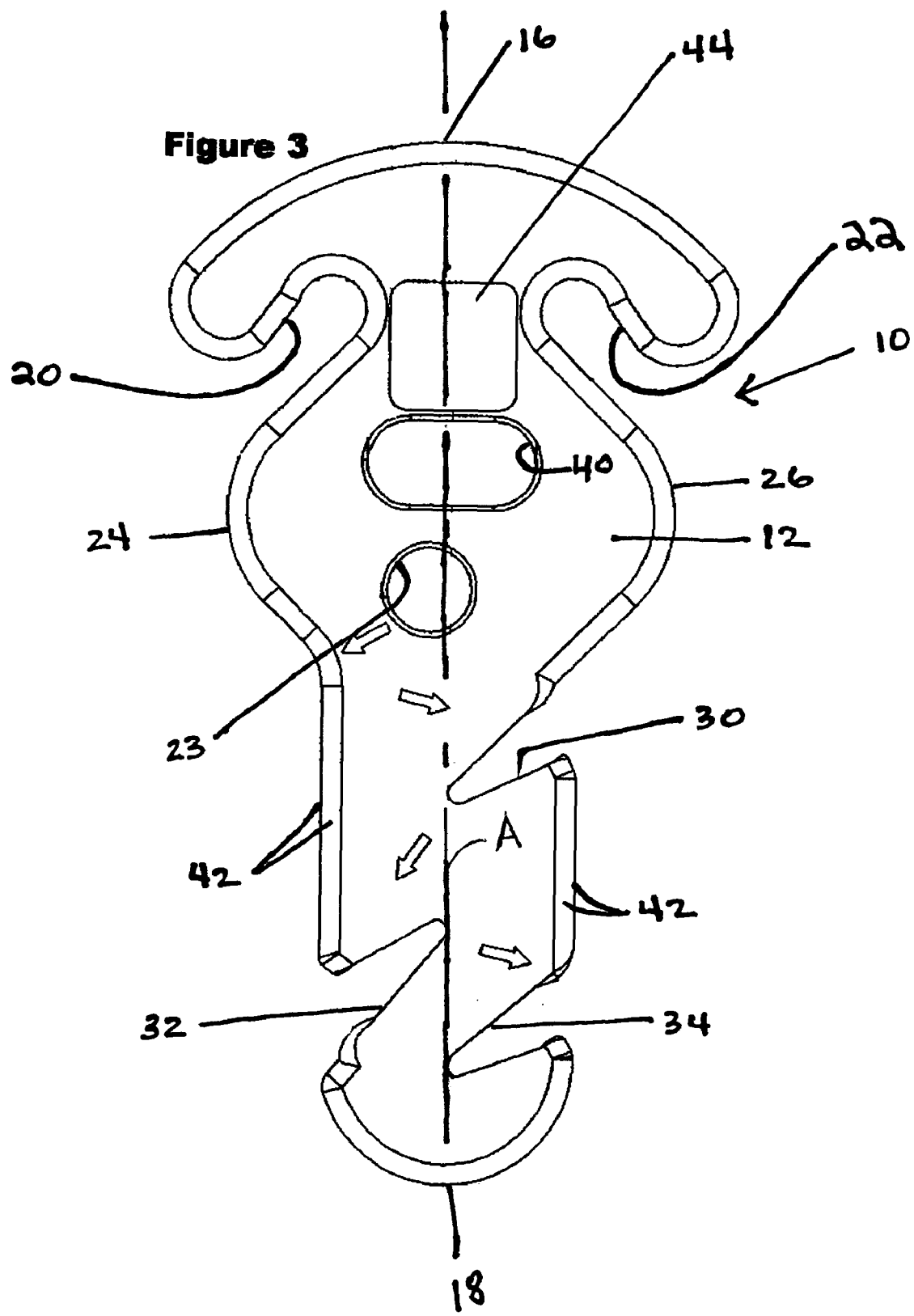
FIG. 3 is a view in elevation of the back face of this invention.
Figure 7:
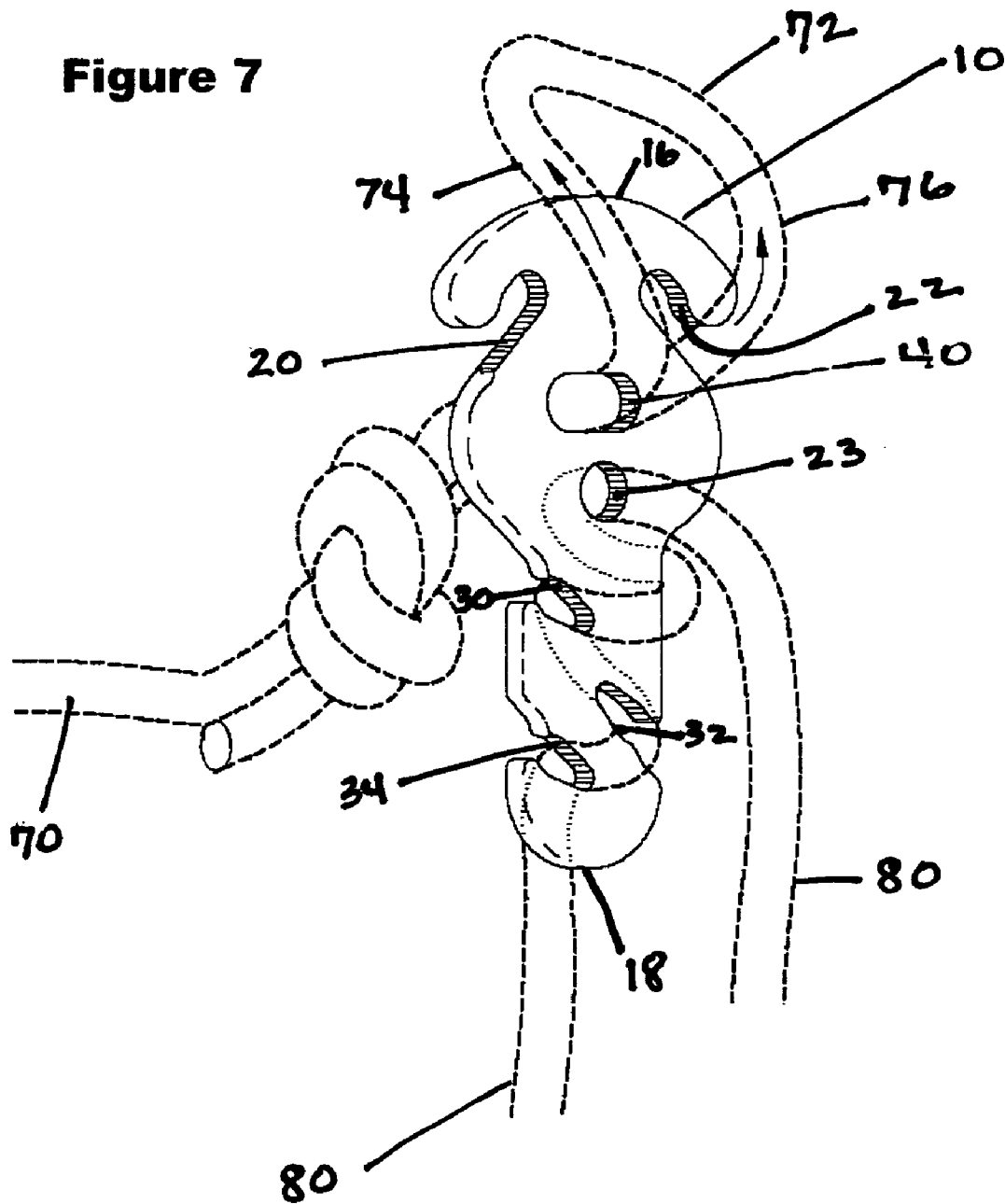
FIG. 7 is a perspective view illustrating the invention being utilized to couple two ropes.

FIG. 7 exemplifies this invention where it is used to couple two ropes together. Rope 70 is looped at one end and the looped portion 72 is passed through the slot 40 and both portions 74 and 76 are inserted into slots 20 and 22, respectively. The loop portion 72 can be hitched to a support as shown in FIG. 3 if desired. The second rope 80 is helically wound around the apparatus 10 by first passing one end through the drilled hole 23 and then being inserted into slots 30, 32 and 34 in the same manner as depicted in FIGS. 4, 5 and 6.

Although this invention has been shown and described with respect to detailed embodiments thereof, it will be appreciated and understood by those skilled in the art that various changes in form and detail thereof may be made without departing from the spirit and scope of the claimed invention.

We claim:

1. A tensioning and coupling apparatus for a rope or line including a planar member having a top edge, a bottom edge and opposing side edges, a drilled hole disposed intermediate said opposing side edges for receiving the rope or line, an enclosed slot adjacent to said hole disposed intermediate said opposing side edges and intermediate said bottom edge and said top edge for receiving a looped portion of said rope or line, a pair of diametrically opposed slots extending from each of said opposing side edges for receiving each portion of said looped portion, and a series of tapered slots alternately disposed on said opposing side edges and being spaced from each other and extending toward said bottom edge, said series of tapered slots for receiving said rope or line whereby the rope or line is wound around said planar member and sequentially inserted into alternate of said series of tapered slots to helically wind said rope around a portion of said planar member and hold said rope.

2. A tensioning and coupling apparatus for a rope or line as claimed in claim 1 including a vertical center line, each of said diametrically opposing tapered slots are angled relative to said center line extending from the opposing side edge and fairing toward said top edge.

3. A tensioning and coupling apparatus for a rope or line as claimed in claim 2 wherein each of said series of tapered slots extend from said opposing side edges and are angularly disposed where alternate tapered slots of said series of tapered slots are alternately angled relative to said center line so that each of said series of tapered slots alternately fair from said opposing side edges toward said bottom edge and toward said top edge and each of said series of tapered slots extend to said center line.

4. A tensioning and coupling apparatus for a rope or line as claimed in claim 3 wherein said series of tapered slots include side surfaces and said side surfaces are flat.

5. A tensioning and coupling apparatus for a rope or line as claimed in claim 4 wherein said top edge, said bottom edge, said opposing side edges, said hole and said slot are formed with a radius on the front face and back face.

6. A tensioning and coupling apparatus for a rope or line as claimed in claim 4 including a recess formed on said front face and said back face, a flat plate complementing the dimensions of said recess for fitting therein and being adaptable to having logo indicia thereon.

7. A tensioning and coupling apparatus for a rope or line as claimed in claim 1 wherein said top edge is contoured and said bottom edge is contoured.

8. A tensioning and coupling apparatus for a rope or line having a planar front face, a planar back face, a top edge, a bottom edge and opposing side edges, a hole disposed intermediate said opposing side edges for receiving the rope or line, an enclosed slot extending through said front face and said back face and being adjacent to said drilled hole and disposed intermediate said opposing side edges and intermediate said top edge and said bottom edge for receiving a looped portion of said rope or line, said top edge, said bottom edge, said opposing side edges, said drilled hole and said enclosed slot are formed with a radius on the back face and front face, a pair of diametrically opposed slots extending from each of said opposing side edges and fairing toward said top edge for receiving each portion of said looped portion, and a series of tapered slots alternately disposed on said opposing side edges and being spaced from each other and alternately extending toward said top edge and said bottom edge, said series of tapered slots for receiving said rope or line whereby the rope or line is wound around said planar member and sequentially inserted into alternate of said series of tapered slots to helically wind said rope around a portion of said planar member and each of said series of tapered slots having inside surfaces whereby said inside surfaces of said series of tapered slots being flat.

9. A tensioning and coupling apparatus for a rope or line as claimed in claim 8 wherein said top edge is contoured and said bottom edge is contoured.

10. A tensioning and coupling apparatus for a rope or line as claimed in claim 8 including a recess formed on said front face and said back face, a flat plate complementing the dimensions of said recess for fitting therein and being adaptable to having logo indicia thereon.

11. A coupling apparatus for ropes or lines including a planar member having a top edge, a bottom edge and opposing side edges, a hole disposed intermediate said opposing side edges for receiving a first rope or line, an enclosed slot adjacent to said hole disposed intermediate said opposing side edges and intermediate said bottom edge and said top edge for receiving a looped portion of a second rope or line and intermediate said hole and said top edge, a pair of diametrically opposed slots extending from each of said opposing side edges adjacent said top edge for receiving each portion of said looped portion, and a series of tapered slots alternately disposed on said opposing side edges and being spaced from each other and extending toward said bottom edge, said series of tapered slots for receiving said first rope or line whereby said first rope or line is wound around said planar member and sequentially inserted into alternate of said series of tapered slots to helically wind said first rope around a portion of said planar member from said tapered slots extending from adjacent to said hole to adjacent said bottom edge wherein said first rope is coupled to said second rope.

12. A coupling apparatus for ropes or lines as claimed in claim 11 including a vertical center line, each of said diametrically opposing slots are angled relative to said center line extending from the opposing side edge and fairing toward said top edge.

13. A coupling apparatus for a rope or line as claimed in claim 12 wherein each of said series of tapered slots extend from said opposing side edges and are angularly disposed where alternate tapered slots of said series of tapered slots are alternately angled relative to said center line so that each of said series of tapered slots alternately fair from said opposing side edges toward said bottom edge and toward said top edge and each of said series of tapered slots extend to said center line.

14. A coupling apparatus for a rope or line as claimed in claim 13 wherein said series of tapered slots include side surfaces and said side surfaces are flat.

15. A coupling apparatus for a rope or line as claimed in claim 14 wherein said tapered top edge, said bottom edge, said opposing side edges, said hole and said enclosed slot are formed with a radius on the front face and back face.

16. A tensioning and coupling apparatus for a rope or line as claimed in claim 14 including a recess formed on said front face and said back face, a flat plate complementing the dimensions of said recess for fitting therein and being adaptable to having logo indicia thereon.

17. A tensioning and coupling apparatus for a rope or line as claimed in claim 11 wherein said top edge is contoured and said bottom edge is contoured.

\* \* \* \* \*